Patented Oct. 16, 1934

1,977,178

UNITED STATES PATENT OFFICE 1,977,178

PRODUCTION OF 1,3,5-TRIMETHYL BENZENE

Hans Dohse, Heidelberg, and Curt Schuster, Ludwigshafen-on-the-Rhine, Germany, assignors to I. G. Farbenindustrie Aktiengesellschaft, Frankfort-on-the-Main, Germany No Drawing. Application February 21, 1933, Serial No. 657,838. In Germany March 10, 1932

7 Claims. (Cl. 260—168)

The present invention relates to the production of 1,3,5-trimethyl benzene.

1,3,5-trimethyl benzene (mesitylene), a valuable initial material, for example for the production of dyestuff intermediates may be produced on an industrial scale only with great difficulties. The known process for the production of 1,3,5-trimethyl benzene from acetone by means of concentrated sulphuric acid is very tedious and, at the most, yields of only 15 per cent of the theoretical yields of 1,3,5-trimethyl benzene can be obtained by this method. Comparatively better yields of up to about 17.5 per cent may be obtained by treating acetone with certain catalysts, in particular with aluminium oxide or zinc chloride, at temperatures of from 300° to 500° C. and under increased pressure, ranging up to 200 atmospheres. Hydrogen chloride has also been proposed as a condensing agent in the production of 1,3,5-trimethyl benzene from acetone. This latter process, however, cannot be employed for the production of trimethyl benzene on an industrial scale owing to the corroding action of hydrochloric acid upon the apparatus constructed from metals such as copper, iron, steel, aluminium and the like.

We have now found that 1,3,5-trimethyl benzene can be obtained in a simple manner and in a yield ranging from about 40 up to about 60 per cent of the theoretical yield by catalytically dehydrating acetone at elevated temperature and at a pressure above atmospheric pressure, while employing as the catalyst a hydrate of alumina of natural origin, such as bauxite, hydrargillite, hydrotalkite, boehmite, diaspore, voelknerite and the like. The said hydrate of alumina is preferably employed after previous partial or total dehydration which may be effected by heating at temperatures between about 300° C. and about 1000° C., preferably between about 600° and about 900° C. The said hydrates of alumina may be employed either alone or together with inert, superficially active substances, such as carbon, pumice stone, silica gel and the like. The temperatures to be maintained during this process generally lie between about 250° and about 450° C., preferably between about 330° and about 370° C., and the pressures between about 50 and about 300 atmospheres, preferably between about 150 and about 250 atmospheres. Instead of acetone, its non-cyclic condensation products obtainable therefrom by splitting off water, i. e. mesityl oxide and phorone, either alone or in mixture with each other and with acetone, may be employed.

The process may be carried out in a continuous or discontinuous manner. The reaction vessels may be constructed from practically all metals which are sufficiently stable at the temperatures and pressures employed. Thus, iron, nickel, copper, and alloys of these metals with each other or with other metals, such as chromium, cobalt or manganese may be used for constructing the apparatus. Iron vessels, preferably lined with copper are, however, usually employed because of their cheapness. When working discontinuously, i. e. by heating up the mixture of acetone with the catalyst in a closed vessel, the catalyst is generally employed in an amount of from 5 to about 20 per cent by weight of the acetone. Revolving or stirring autoclaves are particularly suitable for working discontinuously. When working in a continuous manner it is advantageous to dilute the acetone vapours with up to about 20 per cent by volume of guide gases such as nitrogen, carbon monoxide, carbon dioxide, coke oven gas, argon, methane or ethane.

The catalyst may be employed in a ground state, or in the form of pieces, this latter form being preferred when working continuously.

The following examples will further illustrate the nature of the present invention which, however, is not limited thereto. The parts are by weight.

Example 1

18 parts of acetone are heated for 10 hours to 330° C. in a pressure-tight iron vessel together with 4 parts of powdered bauxite, which has previously been heated for about 1 hour to about 900° C. The pressure in the vessel rises up to 160 atmospheres. The reaction product is distilled off from the hot vessel. It consists of unchanged acetone, water and condensation products of acetone. By fractional distillation of the reaction product, 4 parts of trimethyl benzene, that is about 43 per cent of the theoretical yield calculated on the acetone consumed, are obtained, and also about 1 part of mesityl oxide and a small amount of phorone, which, together with the unchanged acetone, can be subjected to a new treatment with bauxite.

Example 2

18 parts of acetone and 2 parts of bauxite which has been previously heated for about 1 hour to about 900° C. are heated for 6 hours to 360° C. in a pressure-tight iron vessel lined with copper. The pressure rises to about 180 atmospheres. Trimethyl benzene is obtained in an amount of 52 per cent of the theoretical yield calculated on the acetone consumed. Similarly good results may be obtained by replacing the bauxite by 2 parts of hydrargillite which has been heated for about 3 hours to about 600° C. If, instead of bauxite, 2 parts of a product obtained by precipitating, by means of aqueous ammonia, aluminium hydroxide from an aqueous solution of aluminium nitrate, washing the precipitate and heating it to 900° C. for about 1 hour, are employed, the yield in trimethyl benzene is only 22 per cent of the theoretical yield calculated on the acetone consumed.

Example 3

40 parts of acetone vapors are passed in the course of 24 hours and at a pressure of 200 atmospheres through a pressure-tight iron tube lined with copper and filled with 10 parts of bauxite which has been previously heated for about 1 hour to about 900° C., the catalyst being employed in the form of pieces having about the size of peas or walnuts. The reaction tube is heated at a temperature of 330° C. by means of an electric heating device. 9 parts of trimethyl benzene are thus formed, that is 52 per cent of the theoretical yield calculated on the acetone consumed.

What we claim is:—

1. In the production of 1,3,5-trimethyl benzene by a catalytic dehydration of acetone while heating to temperatures of from 250° to 450° C. and at a pressure between about 50 and about 300 atmospheres, the employment of an alumina hydrate of natural origin as the catalyst.

2. In the production of 1,3,5-trimethyl benzene by a catalytic dehydration of acetone while heating to temperatures of from 250° to 450° C. and at a pressure between about 50 and about 300 atmospheres, the employment of an at least partially dehydrated alumina hydrate of natural origin as the catalyst.

3. In the production of 1,3,5-trimethyl benzene by a catalytic dehydration of acetone while heating to temperatures of from about 330° to about 370° C., and at between about 150 and about 250 atmospheres, the employment of an alumina hydrate of natural origin as the catalyst.

4. In the production of 1,3,5-trimethyl benzene by a catalytic dehydration of acetone while heating to temperatures of from about 330° to about 370° C. and at a pressure between about 150 and about 250 atmospheres, the employment of an alumina hydrate of natural origin as the catalyst.

5. In the production of 1,3,5-trimethyl benzene by a catalytic dehydration of acetone while heating to temperatures of from about 330° to about 370° C. and at a pressure between about 150 and about 250 atmospheres, the employment of bauxite as the catalyst.

6. In the production of 1,3,5-trimethyl benzene by a catalytic dehydration of acetone while heating to temperatures of from about 330° to about 370° C. and at a pressure between about 150 and about 250 atmospheres, the employment of at least partially dehydrated bauxite as the catalyst.

7. In the production of 1,3,5-trimethyl benzene by a catalytic dehydration of acetone while heating to temperatures of from about 330° to about 370° C. and at a pressure between about 150 and about 250 atmospheres, the employment of a bauxite dehydrated by heating to about 900° C. as the catalyst.

HANS DOHSE.
CURT SCHUSTER.